(12) United States Patent
Boulouednine et al.

(10) Patent No.: US 7,049,769 B2
(45) Date of Patent: May 23, 2006

(54) CIRCUIT ARRANGEMENT AND METHOD FOR AN ILLUMINATION DEVICE HAVING SETTABLE COLOR AND BRIGHTNESS

(75) Inventors: Mourad Boulouednine, Munich (DE); Alexander Faller, Dachau (DE)

(73) Assignee: Patent Treunand Gesellschaft fur elektrische Gluhlampen mbH, Munich (DE)

( * ) Notice: Subject to any disclaimer, the term of this patent is extended or adjusted under 35 U.S.C. 154(b) by 0 days.

(21) Appl. No.: 10/765,875

(22) Filed: Jan. 29, 2004

(65) Prior Publication Data

US 2004/0183475 A1    Sep. 23, 2004

(30) Foreign Application Priority Data

Feb. 6, 2003    (DE) ................................ 103 04 875

(51) Int. Cl.
*H05B 37/00* (2006.01)
(52) U.S. Cl. .................. 315/324; 315/312; 315/185 S; 307/34; 307/31
(58) Field of Classification Search ................ 315/312, 315/324, 185 S, 200 A; 362/800
See application file for complete search history.

(56) References Cited

U.S. PATENT DOCUMENTS

| | | | |
|---|---|---|---|
| 6,016,038 A | 1/2000 | Mueller et al. ............. 315/291 |
| 6,392,553 B1 * | 5/2002 | Mollet et al. ............... 340/642 |
| 6,400,104 B1 * | 6/2002 | Ham ........................... 315/312 |
| 2002/0047624 A1 * | 4/2002 | Stam et al. .................. 315/291 |
| 2002/0048177 A1 | 4/2002 | Rahm et al. ................. 362/555 |
| 2002/0171379 A1 * | 11/2002 | Adamson ..................... 315/312 |

FOREIGN PATENT DOCUMENTS

| | | |
|---|---|---|
| DE | 200 02 060 U1 | 6/2000 |
| DE | 200 07 134 U1 | 8/2000 |
| DE | 100 51 528 A1 | 5/2002 |
| EP | 1 152 642 A2 | 11/2001 |
| EP | 1 152 642 A3 | 10/2003 |

OTHER PUBLICATIONS

European Patent Office Search Report (referencing all documents listed above) dated May 2004.

* cited by examiner

*Primary Examiner*—Tuyet Thi Vo

(57) ABSTRACT

It is intended to be possible to use a respective setting apparatus (E1, E2) to set the color and the brightness of an illumination device separately. Light sources having three different colors are operated for this purpose. Only one first power supply (CON, PWM1) is provided for two colors, whereas the third color is supplied by a second power supply (CON, PWM2). The brightness can be set by altering the power output of the first (CON, PWM1) and the second (CON, PWM2) power supplies at the same time. The color can be set by altering the power output of the second (CON, PWM2) power supply.

16 Claims, 4 Drawing Sheets

CIRCUIT ARRANGEMENT AND METHOD FOR AN ILLUMINATION DEVICE HAVING SETTABLE COLOR AND BRIGHTNESS

FIELD OF THE INVENTION

The invention relates to circuit arrangements which allow both the color and the brightness of radiated light to be set in an illumination device.

BACKGROUND OF THE INVENTION

The color of a light source, also referred to as the chromaticity in the literature, is generally determined using a standardized chromaticity diagram. This standardized chromaticity diagram is defined in the standard DIN 5033 or in the equivalent international standard CIE 1931. In the standardized chromaticity diagram, a color is determined by an x and a y coordinate. FIG. 1 shows a standardized chromaticity diagram. All colors visible to the human eye lie within a color triangle T. A so-called achromatic point U is determined by the coordinates x=0.33 and y=0.33. Colors in the region around the achromatic point U are generally perceived as white. The colors assumed by daylight during the course of a day lie on a so-called D line D.

In order to provide an illumination device which is capable of radiating light whose color can be set, for example the colors which lie on the D line, three light sources of different colors are required in the illumination device. The colors of the three light sources lie, for example, at the points B, G, R illustrated in FIG. 1. In this case, in the example, point B lies in the blue region of the standardized chromaticity diagram, point G in the green region and point R in the red region. By setting the brightness of the three light sources, the illumination device can radiate all the colors which lie within the triangle BGR which is formed by the three points B, G and R.

According to the prior art, a described illumination device requires a circuit arrangement which contains a power supply for each of the three light sources. At least four connection lines are required to connect the three light sources, in this case a common reference potential being provided for all three light sources.

Each of the three power supplies requires a setting apparatus for setting the brightness of the light sources. If the brightness of the light radiated by the illumination device is intended to be set, without the color of the light being substantially altered, the three setting apparatuses must be actuated at the same time or a fourth setting apparatus needs to be provided. This fourth setting apparatus must make it possible for the power output of all three power supplies to be set at the same time.

In the prior art, it has proved disadvantageous that considerable outlay is required to provide the above-described luminous colors, and that setting color and brightness easily is impossible without additional outlay.

SUMMARY OF THE INVENTION

The object of the present invention is to provide a circuit arrangement which accomplishes the setting of color and brightness of an illumination device with low outlay.

A further object of the present invention is to provide for the color of an illumination device to be set with low outlay, the settable colors lying on one line in the standardized chromaticity diagram.

A further object of the present invention is to make it easy to set the color and brightness of an illumination device.

These objects are achieved by a circuit arrangement having the following features:

A connection apparatus (S) for a first (G1) and a second (G2) group of light sources, a first (CON, PWM1) and a second (CON, PWM2) power supply, the first power supply (CON, PWM1) making it possible to set the power output to the first group (G1) of light sources and the second power supply (CON, PWM2) making it possible to set the power output to the second group (G2) of light sources, a first (E1) and a second (E2) setting apparatus, it being possible to use the first setting apparatus (E1) to set the power output of the first (CON, PWM1) and, at the same time, the second (CON, PWM2) power supply, whereas the second setting apparatus (E2) may be used to set only the power output of the second power supply (CON, PWM2).

A circuit arrangement according to the invention has a connection apparatus for a first and a second group of light sources. Since a common reference potential can be provided for both groups, three electrical connecting lines from the circuit arrangement to the two groups of light sources are sufficient.

Since only two groups of light sources of the circuit arrangement are to be supplied with power, a circuit arrangement according to the invention has only a first and a second power supply. The two power supplies can be set, the first power supply making it possible to set the power output to the first group of light sources and the second power supply making it possible to set the power output to the second group of light sources.

In order to set the power output of the power supplies, the circuit arrangement has a first and a second setting apparatus.

According to the invention, it is possible to use the first setting apparatus to set the power output of the first and, at the same time, the second power supply, whereas the second setting apparatus may be used to set only the power output of the second power supply.

In general, the circuit arrangement operates as part of an illumination device having a first and a second group of light sources, the first group of light sources radiating a first color and the second group of light sources radiating a second color. The first and the second colors can be entered as first and second point in the standardized chromaticity diagram. The two colors are preferably different, making it possible for a first connecting line to be drawn between the two points in the standardized chromaticity diagram. All of the colors which can be output by the illumination device lie on this first connecting line.

According to the invention, the first setting apparatus is used to set the power output of the first and, at the same time, the second power supply and thus, at the same time, the brightness of the first and the second groups of light sources. The first setting apparatus thus makes it possible for the brightness of the illumination device to be altered without substantially influencing the color output by the illumination device.

According to the invention, the second setting apparatus is used to set only the power output of the second power supply and thus the brightness of the second group of light sources. The second setting apparatus thus makes it possible to alter the color output by the illumination device.

The colors of the first and the second groups of light sources must be selected such that all of the colors which are intended to be output by the illumination device lie on the first connecting line. However, a light source cannot generally be obtained with any desired color, which, for the time being, restricts the position of the first connecting line.

It is therefore advantageous that at least one group of light sources comprises differently colored subgroups of light sources. Without any loss of generality, the first group of light sources will in this case comprise a first and a second subgroup having a third and a fourth color. The third and the fourth colors are represented in the standardized chromaticity diagram by a third and a fourth point between which a second connecting line can be drawn.

The abovementioned first point in the standardized chromaticity diagram lies on the second connecting line. The position of the first point can be determined by the ratio of the brightness of the first and the second subgroups of light sources. The first connecting line can thus be brought into a desired position.

BRIEF DESCRIPTION OF THE DRAWINGS

The invention is to be explained in more detail below using exemplary embodiments and with reference to drawings, in which.

DETAILED DESCRIPTION OF THE INVENTION

Figure 2:
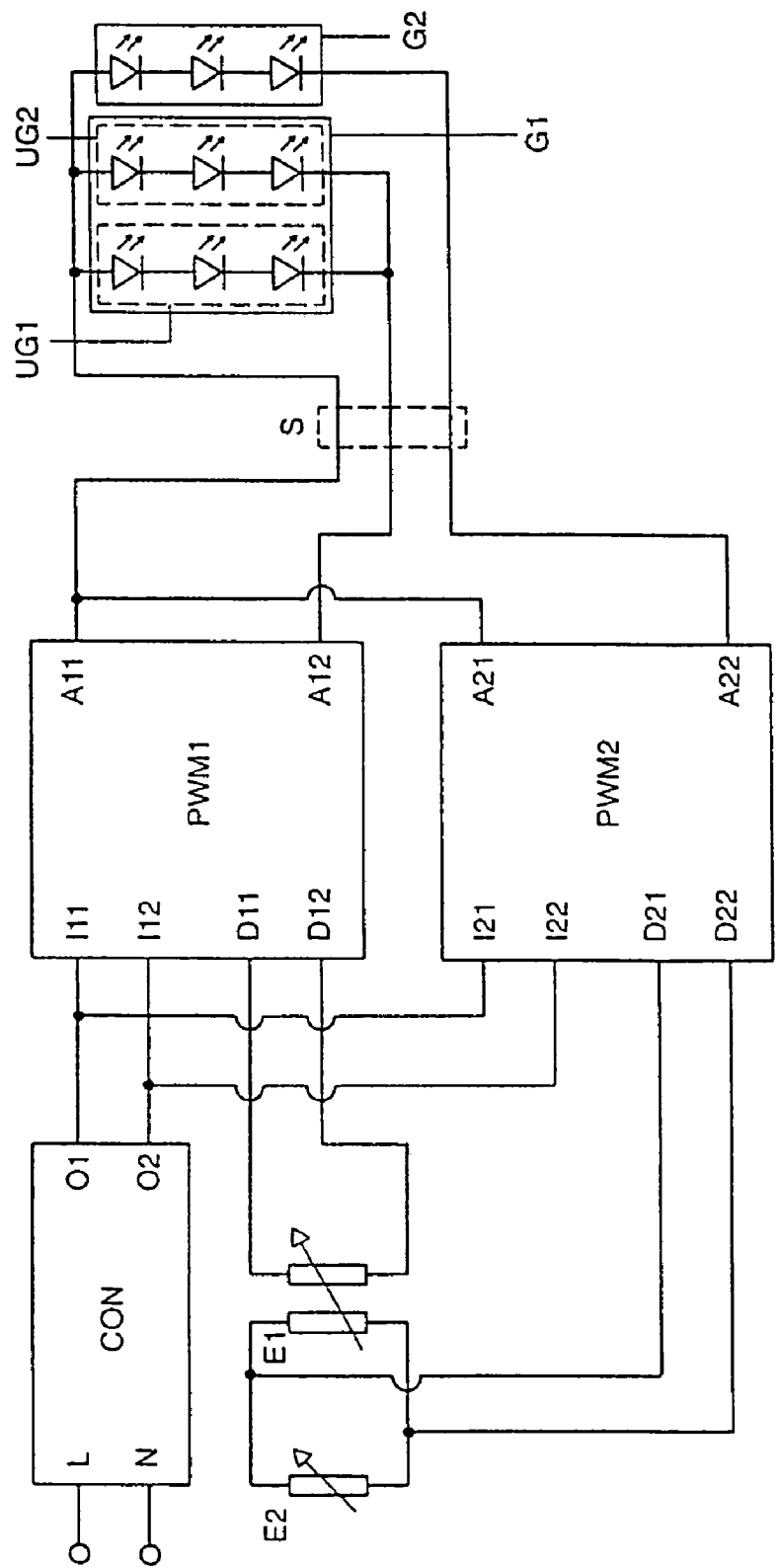
FIG. 2 shows a block diagram of a preferred embodiment of the invention.

FIG. 2 shows a block diagram of a preferred embodiment of the invention. The block diagram shows a preferred embodiment of a circuit arrangement having light sources connected.

A voltage transformer CON draws power, via terminals L and N, from a power source (not shown) which is, for example, in the form of a mains voltage or a battery. The voltage transformer CON provides an operating voltage at its terminals O1 and O2, which is suitable for operating light sources connected to the circuit arrangement.

The operating voltage is fed in to a first and a second dimming device (PWM1, PWM2) via the terminals I11 and I12 and, respectively, I21 and I22. The first dimming device PWM1 has two terminals A11 and A12 to which a first group G1 of light sources is connected. The second dimming device PWM2 has two terminals A21 and A22 to which a second group G2 of light sources is connected.

In the exemplary embodiment illustrated, the terminal A21 is connected to the terminal A11. The two groups of light sources thus have a common reference potential which need only be fed once to the light sources. Advantageously, only three connection lines are therefore required from the circuit arrangement to the light sources. The connection lines may be designed such that they can be plugged in by means of a connection apparatus S. The common reference potential in the exemplary embodiment is selected to be the potential of the terminal A11. With a corresponding internal circuitry for the dimming devices PWM1 and PWM2, a connection between A11 and A21 is already provided by the connection between I11 and I21 or the connection between I12 and I22. A connection between A11 and A21 is then no longer required.

The voltage transformer CON forms, together with the dimming device PWM1, the power supply for the first group of light sources. Furthermore, the voltage transformer CON, together with the dimming device PWM2, forms the power supply for the second group of light sources. With additional outlay it is also possible to use a separate voltage transformer for each dimming device PWM1, PWM2.

The dimming devices PWM1 and PWM2 each have a pair of terminals D11, D12 and D21, D22, respectively, by means of which it is possible to set the power output to the respective group of light sources. When setting manually, an embodiment in which setting can be carried out using potentiometers is advantageous since only low outlay is required for setting apparatuses. In principle, however, it is also possible to use another embodiment for the setting, such as, for example, by means of variable voltage or current sources or by means of digital command sequences.

A first setting apparatus E1 comprises two potentiometers which are operated at the same time. Such an arrangement is also referred to as a tandem or stereo potentiometer. One potentiometer of this tandem potentiometer is connected to the terminals D11 and D12, making it possible to set the power output of the dimming device PWM1. The other potentiometer of this tandem potentiometer is connected to the terminals D21 and D22, making it possible to set the power output of the dimming device PWM2. The first setting apparatus E1 is thus actuated so as to alter the brightness of the first and the second groups of light sources at the same time. This means that the brightness of the light output by the illumination device is altered without altering the color.

A second setting apparatus E2 comprises one potentiometer. This potentiometer is connected to the terminals D21 and D22, making is possible to set the power output of the dimming device PWM2. The second setting apparatus E2 is thus actuated so as to alter the brightness of the second group of light sources. This means that the color of the light output by the illumination device is altered.

The described circuitry for the setting apparatuses means that the potentiometer of the second setting apparatus E2 is connected in parallel with the potentiometer, which is connected to the second dimming device PWM2, of the first setting apparatus E1. In order for it to be possible to influence the effect of the potentiometer, resistors can be connected in series and/or in parallel with the potentiometers.

In order to set the power output, pulse width modulation is advantageously used in the dimming devices PWM1 and PWM2. This functions with little power loss. Particularly suitable is pulse width modulation in combination with light emitting diodes as light sources.

In the exemplary embodiment shown in FIG. 2, light emitting diodes, referred to below as LEDs, are used as the light sources. However, other light sources, such as, for example, incandescent or discharge lamps or organic LEDs may also be used if suitable power supplies are provided.

The first group G1 of light sources comprises 2 subgroups UG1 and UG2 connected in parallel. The subgroups may optionally also be connected in series. Each subgroup UG1, UG2 comprises, in the example, 3 LEDs, connected in series. The subgroups UG1, UG2 may also comprise a different number of LEDs which are connected in series or in parallel.

The second group G2 of light sources comprises, in the example, 3 LEDs, connected in series. The invention may, however, also be designed with any number of LEDs connected in series or in parallel. The number of LEDs in the respective group or subgroup determines the luminous flux component which it contributes to the total luminous flux of the illumination device.

In the table below, preferred embodiments of the groups and subgroups of light sources are summarized with respect to color, radiated wavelength and luminous flux component:

|     | Color | Wavelength λ | Luminous flux component |
| --- | --- | --- | --- |
| UG1 | red | 617 nm | 51% |
| UG2 | green | 525 nm | 36% |
| G2  | blue | 470 nm | 13% |

Figure 3:
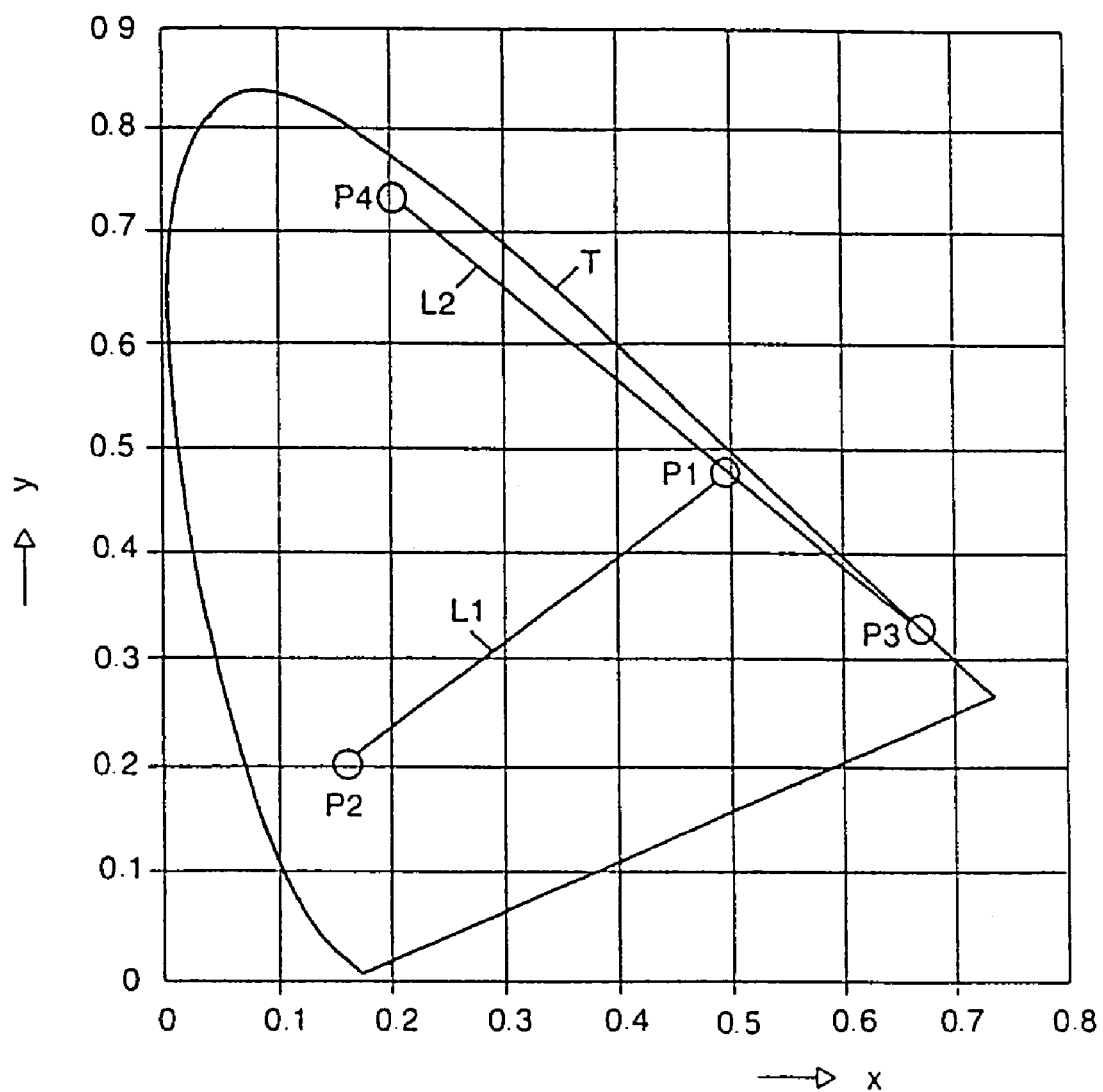
FIG. 3 shows a standardized chromaticity diagram with points indicated by way of example for the colors of the light sources of a preferred embodiment of the invention.

FIG. 3 shows the values given in the table above within a standardized chromaticity diagram. The point P2 represents the color of the second group G2 of light sources. The point P3 represents the color of the first subgroup UG1 of light sources. The point P4 represents the color of the second subgroup UG2 of light sources. Advantageously, the colors of the light sources are selected such that the triangle P2, P3, P4 covers as large an area as possible. There is thus a broad selection of colors that can be set.

A dimming path L1, on which lie essentially those colors which are to be radiated by the illumination device, is drawn through the point P2. The dimming path L1 intersects, at point P1, the line L2 which connects the points P3 and P4. All of the colors which can be radiated by the first group G1 of light sources lie on the line L2. The ratio of the brightness of the first and second subgroups UG1, UG2 must now be selected such that the color of the radiated light of the first group G1 is located at the point P1.

The second setting apparatus E2 can now be used, in the example illustrated, to set any color on the dimming path L1 between point P1 and point P2.

Figure 1:
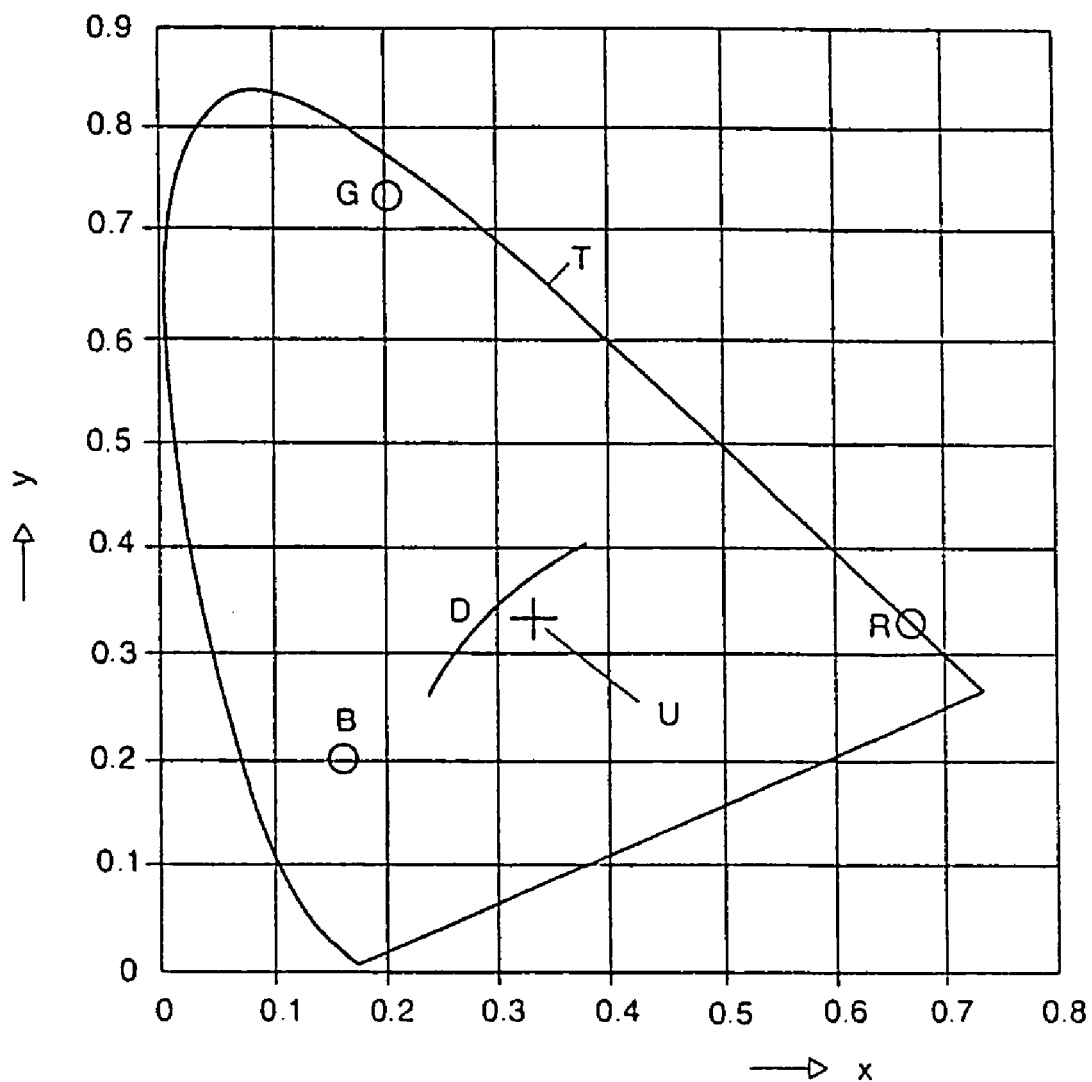
FIG. 1 shows a standardized chromaticity diagram (described in the section relating to the prior art)

For general illumination purposes, the dimming path L1 advantageously intersects that region of the standardized chromaticity diagram which corresponds almost to the color white. The second setting apparatus E2 can then be used to set different white boundaries. In the example, the D line shown in FIG. 1 nestles up against the dimming path L1. This makes it possible for the illumination device to simulate different daylight impressions.

Figure 4:
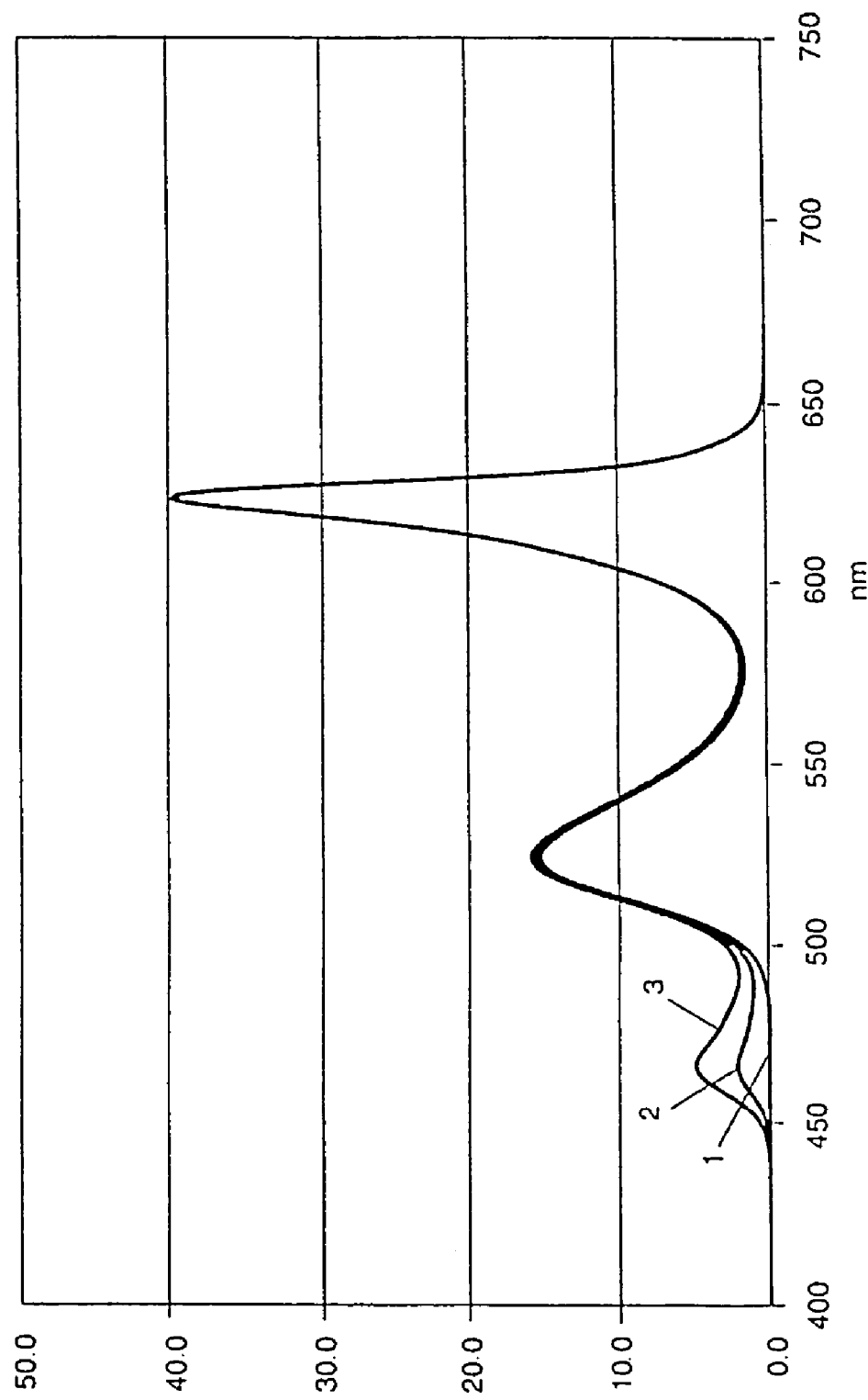
FIG. 4 shows the spectrum of the light radiated by a preferred embodiment of the invention at various settings of the second setting apparatus.

FIG. 4 shows the spectrum of the light of an illumination device as is described in the exemplary embodiment. Along the x axis is given the wavelength λ in nm (nanometers). Along the y axis is given a relative intensity with an arbitrary scale.

Three spectra 1, 2, 3 are shown for three different settings of the second setting apparatus E2:

With spectrum 1, the brightness of the second group G2 of light sources is reduced to almost zero by means of the second setting apparatus E2. The radiated color of the illumination device is accordingly located at the point P1 in FIG. 3.

With spectrum 3, the brightness of the second group G2 of light sources is set to a maximum value by means of the second setting apparatus E2. The radiated color of the illumination device is accordingly located close to the point P2 in FIG. 3.

With spectrum 2, the brightness of the second group G2 of light sources is set to a mean value by means of the second setting apparatus E2. The radiated color of the illumination device is accordingly located in the central region of the dimming path L1.

The comparison of spectra 1, 2 and 3 shows that the total brightness of the illumination device is not substantially influenced by the second setting apparatus E2. The colors of the light sources are accordingly advantageously selected such that an alteration to the color of the light radiated by the illumination device does not substantially alter the brightness.

The invention claimed is:

1. An illumination device, comprising:
   a first (G1) and a second (G2) group of light sources;
   a circuit arrangement, comprising:
      a first (CON, PWM1) and a second (CON, PWM2) power supply, wherein:
         the first power supply (CON, PWM1) supplies power to the first group of light source; and
         the second power supply (CON, PWM2) supplies power to the second group of light sources;
      a first (E1) and a second (E2) setting apparatus, wherein:
         the first setting apparatus (E1) is operable to set a power output of the first (CON, PWM1) and, at the same time, a power output of the second (CON, PWM2) power supply, the first setting apparatus including a first and a second potentiometer, the first and second potentiometer being coupled to each other, wherein the first potentiometer is used to set the power output of the first power supply (CON, PWM1), and the second potentiometer is used to set the power output of the second power supply (CON, PWM2); and
         the second setting apparatus (E2) is operable to set the power output of only the second power supply (CON, PWM2), the second setting including a potentiometer which is connected in parallel with the second potentiometer of the first setting apparatus (E1); and
   connection apparatus (S) for coupling the circuit arrangement to the first (G1) and second (G2) group of light sources.

2. The illumination device of claim 1, wherein the light sources are light-emitting diodes.

3. The illumination device of claim 1, wherein the power output of the first (CON, PWM1) and second (CON, PWM2) power supplies is set by means of pulse width modulation.

4. The illumination device of claim 3, wherein the light sources are light-emitting diodes.

5. The illumination device of claim 1, wherein the connection apparatus (S) has a common reference potential for the first (G1) and second (E2) groups of light sources.

6. The illumination device of claim 5, wherein the light sources are light-emitting diodes.

7. The illumination device of claim 1, wherein the first group (G1) of light sources radiates a first color and the second group (G2) of light sources radiates a second color, the first and the second colors being different.

8. The illumination device of claim 7, wherein the light sources are light-emitting diodes.

9. The illumination device of claim 7, wherein the colors of the groups (G1, G2) of light sources are selected such that the second setting apparatus (E2) is operable to set the illumination device such that it emits white light.

10. The illumination device of claim 9, wherein the light sources are light-emitting diodes.

11. The illumination device of claim 7, wherein at least one the first (G1) and second (G2) groups of light sources includes differently colored subgroups (UG1, UG2) of light sources, wherein the differently colored subgroups are connected either in parallel or in series.

12. The illumination device of claim 11, wherein the light sources are light-emitting diodes.

13. The illumination device of claim 11, wherein:
   the first group (G1) of light sources includes a first subgroup (UG1) having the color red and a second subgroup (UG2) having the color green; and
   the second group (G2) of light sources radiates the color blue.

14. The illumination device of claim 13, wherein the light sources are light-emitting diodes.

15. The illumination device of claim 13, wherein:
   the first subgroup (UG1) having the color red radiates light of a wavelength in the region of 617 nm;
   the second subgroup (UG2) having the color green radiates light of a wavelength in the region of 525 nm; and
   the second group (G2) of light sources radiates light of a wavelength in the region of 470 nm.

16. The illumination device of claim 15, wherein the light sources are light-emitting diodes.

* * * * *